(12) United States Patent
Friedhoff

(10) Patent No.: US 7,873,219 B2
(45) Date of Patent: Jan. 18, 2011

(54) DIFFERENTIATION OF ILLUMINATION AND REFLECTION BOUNDARIES

(75) Inventor: Richard Mark Friedhoff, San Francisco, CA (US)

(73) Assignee: Tandent Vision Science, Inc., San Francisco, CA (US)

( * ) Notice: Subject to any disclaimer, the term of this patent is extended or adjusted under 35 U.S.C. 154(b) by 183 days.

(21) Appl. No.: 12/383,303

(22) Filed: Mar. 23, 2009

(65) Prior Publication Data

US 2010/0074539 A1    Mar. 25, 2010

Related U.S. Application Data

(62) Division of application No. 11/341,752, filed on Jan. 27, 2006, now abandoned.

(60) Provisional application No. 60/648,228, filed on Jan. 27, 2005, provisional application No. 60/650,300, filed on Feb. 3, 2005.

(51) Int. Cl.
*G06K 9/48* (2006.01)
(52) U.S. Cl. .................................... 382/199
(58) Field of Classification Search ........................ None
See application file for complete search history.

(56) References Cited

U.S. PATENT DOCUMENTS

| | | | |
|---|---|---|---|
| 4,685,071 A | 8/1987 | Lee | 364/526 |
| 5,495,536 A | 2/1996 | Osbourn | 382/199 |
| 5,651,042 A | 7/1997 | Dewaele | 378/62 |
| 6,005,683 A | 12/1999 | Son et al. | 358/488 |
| 6,037,976 A | 3/2000 | Wixson | 348/122 |
| 6,061,091 A | 5/2000 | Van de Poel et al. | 348/241 |
| 6,349,113 B1 | 2/2002 | Mech et al. | 375/240.08 |
| 6,428,169 B1 | 8/2002 | Deter et al. | 353/20 |
| 7,031,525 B2 | 4/2006 | Beardsley | 382/199 |
| 7,088,392 B2 | 8/2006 | Kakarala et al. | 348/272 |
| 7,103,227 B2 | 9/2006 | Raskar et al. | 382/266 |
| 7,206,449 B2 | 4/2007 | Raskar et al. | 382/199 |
| 2005/0212794 A1 | 9/2005 | Furukawa et al. | 345/419 |

OTHER PUBLICATIONS

Theo Gevers et al.:"Classifying Color Edges in Video Into Shadow-Geometry, Highlight, or Material Transistions," IEEE Transactions on Multimedia, vol. 5, No. 2, Jun. 2003, pp. 237-243.
Salvador et al.: "Cast shadow segmentation using invariant color features," Computer Vision and Image Understanding, Jun. 2, 2004, pp. 238-259.

(Continued)

*Primary Examiner*—Yuzhen Ge
(74) *Attorney, Agent, or Firm*—Davidson, Davidson & Kappel, LLC; Felix L. D'Arienzo, Jr.

(57) ABSTRACT

The present invention provides methods and apparatus for image processing in which brightness boundaries of an image are identified and analyzed in at least two, and more preferably three or more, spectral bands to distinguish illumination boundaries from reflectance boundaries. For example, in one embodiment of the invention, a brightness boundary of the image can be identified as an illumination boundary if at least two wavelength bands of the image exhibit a substantially common shift in brightness across the boundary.

9 Claims, 10 Drawing Sheets

OTHER PUBLICATIONS

Kobus Barnard and Graham Finlayson, Shadow Identification using Colour Ratios, Proceedings of the IS&T/SID Eighth Color Imaging Conference: Color Science, Systems and Applications, 2000, 97-101.

John M. Rubin et al.:"Color and Image Intensities: When are Changes Material?" Biol. Cybern. 45, 215-226 (1982).

Baba, et al:"Shadow removal from a real picture," Proceedings of the SIGGRAPH 2003 conference on Sketches & Applications, ACM Press, 1-1, 2003, 1 page.

Baba et al:"Shadow removal from a real image based on shadow intensity," ACM SIGGRAPH 2004 Posters, Aug. 8-12, 2004, Los Angeles, 1 page.

K. Barnard, G.D. Finlayson and B. Funt, *Color Constancy for Scenes with Varying Illumination*, Computer Vision and Image Understanding, 65(2): 311-321, Feb. 1997.

H.G. Barrow and J.M. Tenenbaum, *Recovering Intrinsic Scene Characteristics from Imag*, Computer Vision Systems, pp. 3-26, 1978.

C.F. Borges, *A Trichromatic Approximation Method for Surface Illumination*, Journal of Optical Society of America A, 8(8): 1319-1323., Aug. 1991.

M.S. Drew, G.D. Finlayson and S.D. Horley, *Recovery of Chromaticity Image Free from Shadows via Illumination Invariance*, Proceedings of IEEE Workshop on Color and Photometric Methods in Computer Vision, Nice, France 2003, pp. 32-39.

G.D. Finlayson, M.S. Drew and L. Cheng, *Intrinsic Images by Entropy Minimization*, Proceedings of European Conference on Computer Vision, LNCS 3023, pp. 582-595, 2004.

G.D. Finlayson, S.D. Horley and M.S. Drew, *Removing Shadows from Images*, 2002, pp. 2-14.

G.D. Finlayson, S.D. Horley and M.S. Drew, *On the Removal of Shadows from Images*, 2006, pp. 1-11.

G.D. Funklea and R. Bajcsy, *Combining Color and Geometry for the Active, Visual Recognition of Shadows*, University of Pennsylvania Department of Computer & Information Science Technical Report No. MS-CIS-94-62, 1994.

R. Gershon, A.D. Jepson and J. K. Tsotsos, *Ambient Illumination and the Determination of Material Changes*, Journal of Optical Society of America A, 3(10):1700-1707, 1986.

J.M. Geusebroek, R.v.d. Bommgard and A.W.M. Smeulders, *Color Invariance*, IEEE Trans. On Pattern Analysis and Machine Intelligence, 23(12):1338-1350, Dec. 2001.

G.E. Healey, *Using Color for Geometry-Insensitive Segmentation*, Journal of Optical Society of America A, 6(6):920-937, Jun. 1989.

B.K.P. Horn, *Determining Lightness from an Image*, Computer Graphics and Image Processing, 3(1):277-299, Dec. 1974.

G.J. Klinker, S.A. Shafer and T. Kanade, *A Physical Approach to Color Image Understanding*, International Journal of Computer Vision, 4(1): 7-38, Jan. 1990.

E.H. Land and J.J. McCann, *Lightness and Retinex Theory*, Journal of Optical Society of America A, 61:1-11, 1971.

M.S. Langer, *When Shadows Become Interreflections*, International Journal of Computer Vision, 34(2/3), 193-204, 1999.

J.A. Marchant and C.M. Onyango, *Shadow-Invariant Classification for Scenes Illuminated by Daylight*, Journal of Optical Society of America A, 17(11), Nov. 2000.

S.K. Nayar, K. Ikeuchi and T. Kanade, *Shape from Interreflections*, IEEE International Conference onn cOmputr Vision (ICCV), pp. 2-11, Dec. 1990.

I. Omer and M. Werman, *Color Lines: Image Specific Color Representation*, Proceeding of IEEE Conference on Computer Vision and Patter Recognition, pp. 946-953, Jun. 2004.

S.A Shafer, *Using Color to Separate Reflection Components*, Computer Science Department University of Rochester, TR 136, Apr. 1984.

S. Tominaga, *Surface Identification Using Dichromatic Reflection Model*, IEEE Transactions of Pattern Analysis and Machine Intelligence, 13(7), pp. 658-670, Jul. 1991.

S. Tominaga and N. Tanaka, *Estimating Reflection Parameters from a Single Color Image*, IEEE Comput. Graph. Appl., 20(5):58-66, 2000.

J.v.d. Weijer and C. Schmid, *Coloring Local Feature Extraction*, pp. 1-14.

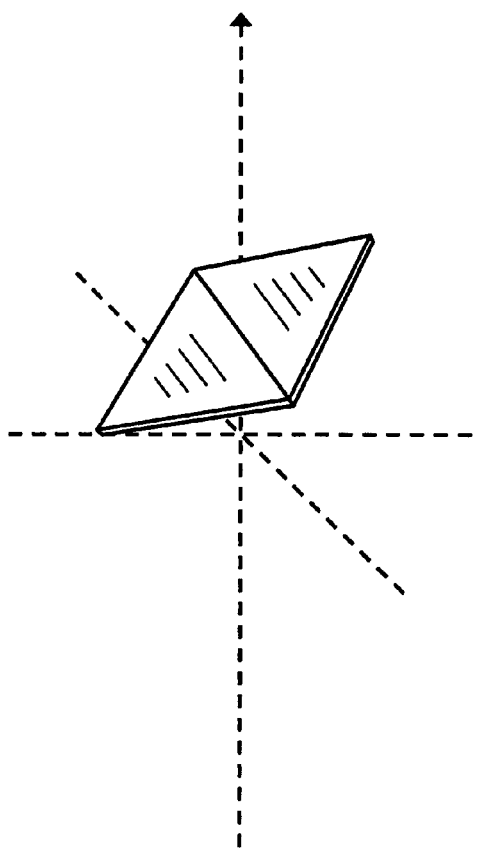
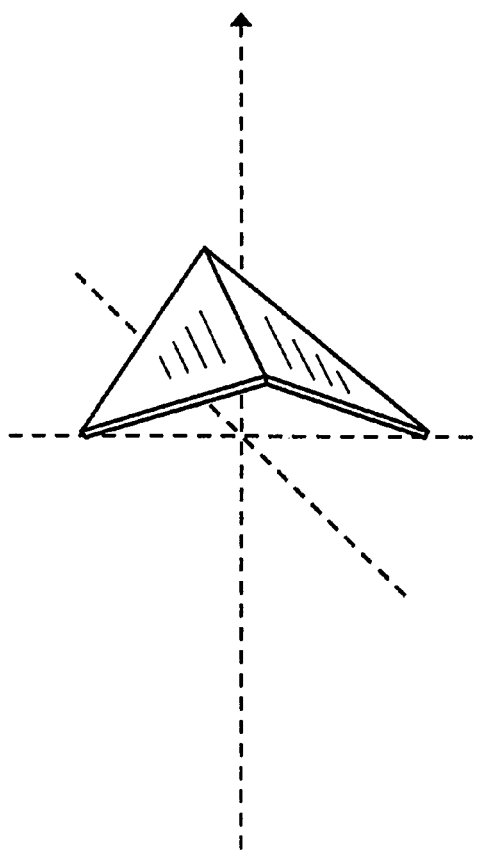
Figure 4a
Figure 4b

DIFFERENTIATION OF ILLUMINATION AND REFLECTION BOUNDARIES

This application is a divisional of U.S. patent application Ser. No. 11/341,752, filed Jan. 27, 2006, which is hereby incorporated by reference herein. Further, this application claims the benefits of U.S. Provisional 60/648,228, filed Jan. 27, 2005 and U.S. Provisional 60/650,300, filed Feb. 3, 2005 both of which are hereby incorporated by reference herein.

FIELD OF THE INVENTION

The present invention relates to methods and apparatus for differentiating illumination boundaries from material boundaries in an image.

BACKGROUND OF THE INVENTION

In general, an image of a scene is a two-dimensional brightness map, each point of which represents a brightness value that is a product of illumination intensity and surface reflectance associated with a portion of the scene imaged to that point. Decomposing this product into illumination and surface reflectance components, or in other words, differentiating variations in illumination from those in surface reflectance or surface color, can be useful in a variety of applications. If the effects of non-uniform illumination can be removed from an image, the changes of surface reflection can be attributed to true material changes.

For example, Edwin Land demonstrated that human color perception is predicated upon estimates of reflectance properties of a viewed surface in three wavelength bands, rather than upon proportions of red, green and blue wavelengths emanating from that surface. More specifically, Land proposed that the eye performs a spatial computation to generate three surface reflectance estimates, each corresponding to one of its three color sensitivity systems, and that these three estimates, which he called lightness designators, define human color perception. Because illumination of a scene may not be uniform, determining these relative reflectance estimates generally requires removing the effects of variations in illumination.

A number of techniques are known in the art for identifying variations in illumination (recognizing shadows) in an image of a scene. Some of these techniques are based on the assumption that shadow boundaries are characterized by gradients. For example, a number of algorithms, such as the Land-McCann algorithm, utilize a spatial thresholding approach in which gradual brightness transitions, i.e., brightness gradients below a defined threshold, are assumed to be due to variations in illumination, while those exhibiting gradients above the threshold are identified as material boundaries.

Such conventional algorithms, however, suffer from a number of shortcomings. First, not all illumination boundaries are gradients. For example, an image of a white cube illuminated with a single spotlight will have boundaries along the edges of the cube that are characterized by stepwise (sharp) variations in illumination. Spatial thresholding techniques would incorrectly classify such illumination boundaries as material boundaries. Defining a threshold value presents another problem. For example, a boundary imaged at a great distance may appear sharp, but may exhibit a gradual gradient when imaged at a closer distance. Further, some material boundaries may in fact exhibit gradual gradients, for example, a boundary characterized by one color blending into another.

Hence, there is a need for enhanced methods for distinguishing illumination boundaries from material (reflectance) boundaries in an image. There is also a need for such methods that would correctly differentiate material and illumination boundaries even when sharp illumination boundaries are present in the image.

BRIEF SUMMARY OF THE INVENTION

Methods and apparatus are disclosed to distinguish between incident and ambient light in order to differentiate illumination from material (reflectance) boundaries. In general, incident light is shadow-forming light while ambient light is shadow-filling light. That is to say, ambient light permits one to observe objects that lack direct illumination. More specifically, it has been discovered that incident and ambient illuminations invariably exhibit different spectra, even when the ambient illumination is due to reflection of incident illumination from a white surface. Hence, an image of a scene illuminated by incident and ambient illumination includes spectral cues related to interplay (correlation) between two or more spectral components (e.g., wavelength bandwidths) of the image, which can be utilized to distinguish illumination boundaries from material (reflectance) boundaries. In particular, substantially identical spectral shifts in at least two, and preferably in three, wavelength bands can be an indicator of an interplay between incident and ambient illumination, and hence can be utilized to identify illumination boundaries of the image.

For example, in one aspect, the present invention provides methods and apparatus for image processing in which brightness boundaries of an image, e.g., an image of a naturally illuminated scene, are identified and then analyzed to distinguish illumination boundaries from reflectance boundaries by comparing shifts in brightness in at least two, preferably three or more, spectral bands. A brightness boundary can be identified as an illumination boundary if the brightness shifts across all of the spectral bands exhibit concordance, e.g., the brightness value measured in each band increases or decreases along with the values measured in the other bands.

For example, a boundary can be identified as an illumination boundary if at least two wavelength bands of the image exhibit a substantially common shift in brightness across the boundary. Such a substantially common shift can be characterized, for example, by a change in brightness of one wavelength band that differs from a corresponding change in brightness of at least another wavelength band by less than a few percent, e.g., by less than about 20 percent, preferably by less than about 10 percent, and more preferably by less than about 5 percent.

Likewise, a brightness boundary can be identified as a reflectance boundary if the brightness shifts across all of the spectral bands do not exhibit concordance, e.g., the brightness value measured in one or more of the bands does not increase or decrease along with the values measured in the other bands.

Further, a brightness boundary can be identified as a concurrent brightness and reflectance boundary if at least two wavelength bands of the image exhibit a decrease in brightness from one side of the boundary to another such that the degree of decrease of one band is substantially different than that of the other band.

When identifying a brightness boundary as an illumination boundary or a reflectance boundary, the degree of concordance need not be absolute. That is, the brightness values measured in each band need not increase or decrease by precisely the same amount. Concordance can be defined, for example, by a vector analysis in which changes in brightness of each band are represented by separate vectors and the "tightness" of the vector cluster determines concordance.

Two or more wavelength bands of an image utilized in the methods of the invention for differentiating illumination boundaries from reflectance boundaries can lie in any suitable portion of the electromagnetic spectrum. For example, these wavelength bands can be in the visible, infrared, or the ultraviolet portions of the electromagnetic spectrum. Further, the wavelength bands can be partially overlapping, or can be disjointed.

In other aspects, the invention provides a method of distinguishing reflectance boundaries from illumination boundaries in an image by initially identifying one or more brightness boundaries of that image. The brightness boundaries can be determined by utilizing any suitable method. For example, a variety of edge detection techniques known in the art can be employed for this purpose.

For each brightness boundary, brightness values of two or more wavelength bands on either side of the boundary are determined. Subsequently, a boundary is classified as a reflectance or an illumination boundary based on a comparison of a change in the brightness values across that boundary for each of the wavelength bands relative to a corresponding change in the other wavelength bands. For example, a boundary can be identified as an illumination boundary when the two or more wavelength bands exhibit a decrease in brightness from one side of the boundary to the other. Alternatively, a boundary can be identified as a reflectance boundary when at least one of the wavelength bands exhibits a decrease in brightness, and at least another wavelength band exhibits an increase in brightness, from one side of the boundary to the other.

In yet another aspect, the invention provides a method of distinguishing reflectance boundaries from illumination boundaries by identifying one or more brightness boundaries in the image, and identifying each brightness boundary as a reflection or an illumination boundary based on a comparison of a spectral signature related to brightness values associated with at least two wavelength bands of the image on one side of the boundary with a corresponding spectral signature on the other side of the boundary. The spectral signature can be characterized by a difference in brightness values associated with the wavelength bands. For example, a brightness boundary can be classified as an illumination boundary when the spectral signatures on two sides of the boundary are both positive or both negative. Alternatively, a brightness boundary can be classified as a reflectance boundary, when the spectral signatures on the two sides of the boundary exhibit different signs.

In another aspect, in a method according to the teachings of the invention for identifying a brightness boundary in an image as either an illumination or a reflectance boundary, at least one brightness boundary of the image is identified and brightness values in at least two wavelength bands on either side of the boundary are determined. The brightness boundary can then be identified as a reflectance or an illumination boundary based on correlation of changes of brightness values across the boundary in the wavelength bands. For example, the boundary can be identified as a reflectance boundary when at least one of the wavelength bands exhibits a decrease, and others exhibit an increase, in brightness from a bright side, i.e., a side having a higher brightness, to the other side of the boundary. Alternatively, the boundary can be identified as an illumination boundary when the wavelength bands exhibit a decrease in brightness from a bright side of the boundary to the other.

In other aspects, the invention provides a method of distinguishing illumination boundaries from reflectance boundaries in image of a scene, which includes identifying a plurality of brightness boundaries in the image, where each boundary separates a high brightness side from a low brightness side. For each of two or more selected wavelength bands of the image and each of the brightness boundaries, image brightness on each side of the boundary is determined. Further, for each of the wavelength bands and each of the brightness boundaries, a brightness difference across the boundary is calculated. Subsequently, for each of the brightness boundaries, a three-component vectors is generated, in which each component is formed as a ratio of an absolute value of the brightness difference across the boundary relative to the brightness value on the bright side of the boundary corresponding to one of the wavelength bands. This is followed by normalizing the vectors. A brightness boundary is identified as an illumination boundary if a normalized vector corresponding to that boundary forms a cluster with one or more vectors corresponding to other boundaries.

In a related aspect, each of the three-component vector ($\overline{V}$) as follows:

$$\overline{V} = \left(\frac{D_L}{B'_L}, \frac{D_M}{B'_M}, \frac{D_S}{B'_S}\right)$$

wherein L, M, and S denote said three wavelength bands, $D_L$, $D_M$, and $D_S$ denote brightness values in the low brightness side of the boundary for each of the three wavelength bands, respectively, and $B'_L$, $B'_M$, $B'_S$ are defined, respectively, as $$B'_L = B_L - D_L; B'_M = B_M - D_M; B'_S = B_S - D_S,$$

wherein $B_L$, $B_M$, and $B_S$ are brightness values in the high brightness of the boundary for each of the wavelength bands, respectively. Further, a normalized vector ($\overline{V}_N$) is defined as follows:

$$\overline{V}_N = \frac{\overline{V}}{\|V\|},$$

wherein $\|V\|$ denotes the norm of $\overline{V}$.

In other aspects, the invention provides an imaging system that includes an image-capture device capable of capturing a multi-spectral image of a scene and a processor programmed to detect edges in the image and analyze the changes in brightness values across such boundaries to differentiate illumination boundaries from reflection boundaries.

The image-capture device can be any suitable imaging device that allows obtaining a multi-spectral image, i.e., an image in at least two different wavelength bands, of a scene. For example, the image-capture device can be a CCD matrix coupled to appropriate filters that can be selectively activated to obtain an image in at least two, and more preferably in three or more, wavelength bands.

In other aspects, the imaging system described above can be utilized, for example, in robotic vision applications to more readily identify shadows and objects. The invention is also useful in image processing applications whereby an initial determination of brightness boundaries and their categorization as either illumination or true material boundaries can be used to identify and remove shadow effects. The determination of such boundaries in an image can also be used by image-capture devices to compensate for shadows, e.g., by modifying the dynamic range of the image detector.

More generally, the present invention permits one to calculate and/or display more accurately the colors of an object within an image of a scene by computation of a shadowless matrix for each wavelength band. (The term "retinex" is used herein to describe each wavelength band.) In essence, each region of the same reflectance is assigned the same color designator despite illumination changes. In one embodiment, bright values can be simply extended into shadow areas. Alternatively; shadow values can be extended into bright areas. In some applications, a more precise color compensation can be achieved by averaging these two techniques.

In another aspect of the invention of the invention, the breadth of cone response stabilizes designators in computation of shadowless matrices. For example, visible light (e.g., from about 400 to about 700 nanometers) is of primary interest in calculating most images and it is usually desirable to employ three spectral bands in such applications. In one embodiment, each band preferably spans a portion of the visible spectrum of at least about 50 nanometers, more preferably at least about 100 or 150 nanometers. An overlap between at least two of the spectral bands can also be desirable.

In another aspect, the present invention can be used to enhance computer graphics. For example, the present invention permits more realistic depictions of animated scenes and objects by providing more realistic determinations of incident and ambient illuminations.

Further understanding of the invention can be obtained by reference to the following detailed description in conjunction with the associated drawings, which are described briefly below.

BRIEF DESCRIPTION OF THE DRAWINGS

FIG. 4A illustrates a "diamond" viewing object for use in the apparatus of FIG. 4;

FIG. 4B illustrates a "wing" shaped object for use in the apparatus of FIG. 4;

DETAILED DESCRIPTION OF THE INVENTION

Figure 1:
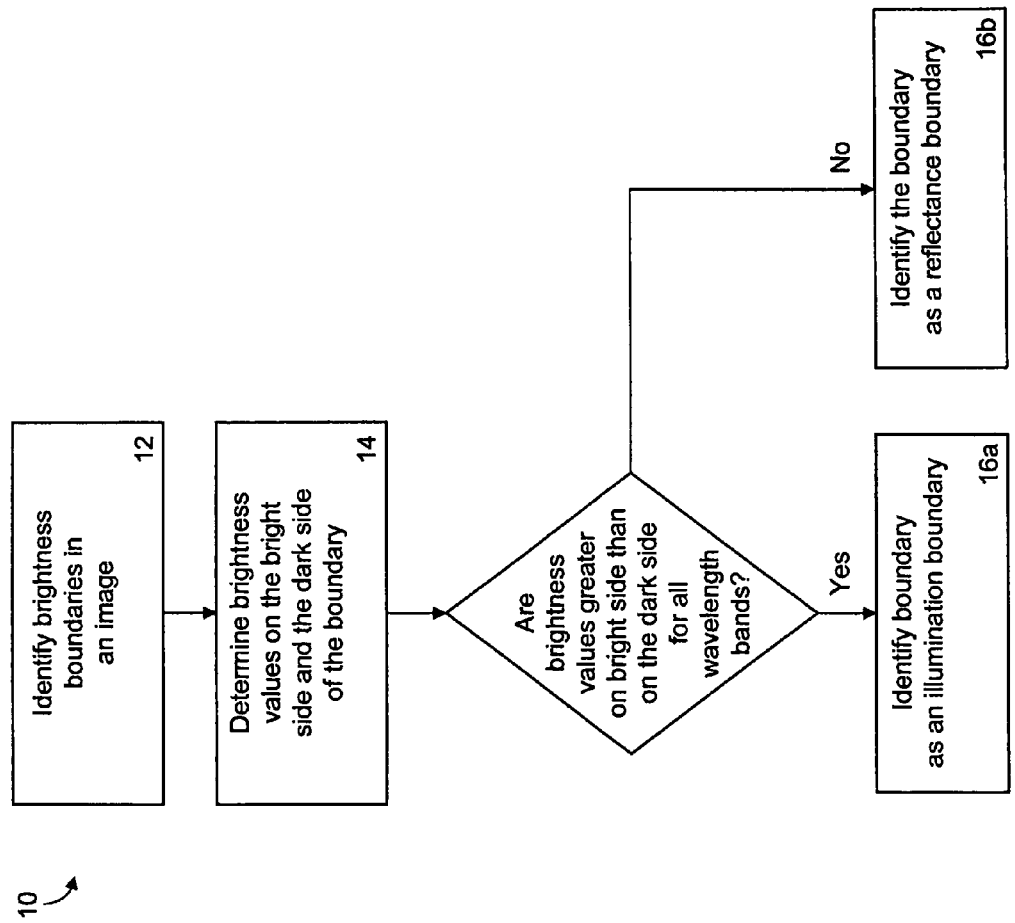
FIG. 1 is a flow chart depicting various steps in one embodiment of a method of the invention for distinguishing illumination boundaries from reflectance boundaries in an image of a scene.

The present invention provides methods and apparatus for differentiating brightness values in an image of a scene, e.g., a scene illuminated with natural light, into separate components corresponding to illumination and surface reflectance. As described in more detail below, the invention achieves such differentiation by comparing spectral signatures associated with at least two, and preferably three distinct wavelength bands, on two sides of brightness boundaries in the image.

In general, an image of a scene represents a two-dimensional map of brightness values received from various portions of the scene. For example, a digital image of a scene provides a two-dimensional matrix of pixels each having a brightness value that is a product of illumination intensity corresponding to a portion of the scene imaged onto that pixel and the surface reflectance of that portion. When a scene is illuminated uniformly, the brightness values in an image of the scene are directly proportional to surface reflectance values with the illumination intensity providing the proportionality constant. However, illumination of a natural scene is typically not uniform, for example, as a result of angle of illumination. Such illumination non-uniformity can result in regions in which illumination is direct and regions in which illumination is indirect, also referred to herein as regions of ambient illumination. Hence, in such cases, the brightness values observed in an image of a scene are not simply proportional to surface reflectance values, but are rather represented by a product of illumination intensity and surface reflectance.

It has been discovered that shadows, i.e., regions of indirect illumination, reveal an important aspect of the illumination environment: the illuminating spectra of incident light is rarely, if ever, identical to that of the ambient illuminant. As discussed in more detail below, this feature can be utilized as a multi-spectral cue for determining illumination flux, which is the first step in estimating reflectance. More particularly, it has been discovered that the interplay of the two illuminating spectra, namely, the incident light that creates shadows and the ambient light that fills shadows, can be employed to detect shadow transitions as a common spectral shift upon various colored surfaces in a scene. For example, if a shadow crosses a green object as well as a blue object, measurements of the bright and the dark sides of both objects can reveal an identical shift in spectra, i.e., the difference between the incident and ambient illuminants, but in different absolute wavelengths. Such a common spectral shift constituted of different wavelengths is highly likely to result from variation of illumination flux rather than changes in surface reflectance.

An image on which the methods of the invention can be practiced is generally a multi-spectral image obtained, for example, in at least two, and more preferably three wavelength bands. The image can be, for example, a color image formed on a photographic emulsion film. Alternatively, the image can be in digital form obtained, for example, by a matrix of CCD elements or a video camera. By way of example, a matrix of CCD elements, in conjunction with three filters, can be utilized to obtain a multi-spectral image of a scene in three wavelength bands, that is, an image encoding a map of brightness in each of the three bands. In preferred embodiments, an image of a scene of interest is obtained in at least two wavelength bands having different center wavelengths. More preferably, in some applications, three wavelength bands can be utilized. These three bands are herein referred to as short, medium, and long wavelength bands to indicate an ascending progression of their respective center wavelengths. By way of example, the three wavelength bands can correspond to the spectral sensitivity of the 3 human cone receptors of the retina. The selection of the wavelength bands is not limited to the visible portion of the electromagnetic spectrum. For example, the wavelength bands can lie in the infrared, ultraviolet, or any other suitable portion of the spectrum. In some embodiments in which a spectraradiometer is utilized, the wavelength bands can be defined post hoc. The wavelength bands can be disjointed, or alternatively they can be partially overlapping. Although three wavelength bands are employed in many embodiments of the invention, the methods of the invention can also be utilized with two wavelength bands, or with more than three wavelength bands.

With reference to flow chart 10 of FIG. 1, in one exemplary method of the invention for differentiating illumination boundaries from reflectance boundaries in an image of a scene, in an initial step 12, one or more brightness boundaries of the image are identified. A brightness boundary separates at least two regions of the image exhibiting different brightness values. That is, a region on one side of the boundary, herein also referred to as the bright side, exhibits a brightness that is higher than a corresponding brightness in a region on the other side of the boundary, herein also referred to as the dark side. Any known technique can be utilized for identifying such brightness boundaries in the image. For example, a variety of edge detection techniques known in the art can be employed for this purpose.

In a subsequent step 14, brightness values are determined on both sides of each identified brightness boundary or transition, i.e., on the "bright" side and the "dark" side, for each of the three wavelength bands. The brightness values can be determined by any suitable technique. For example, the output of CCD elements, coupled to an appropriate filter, that record the image within a wavelength band commensurate with the filter's characteristics can be employed to determine brightness intensity in that wavelength band. In the following discussion of various embodiments of the invention, the brightness values corresponding to the "bright" side of the boundary for long, medium, and short wavelength bands are represented, respectively, as $B_L$, $B_M$, and $B_S$, and the brightness values corresponding to the "dark" side of the boundary are represented as $D_L$, $D_M$, and $D_S$, wherein the subscripts L, M, and S refer, respectively, to long, medium and short wavelength bands.

In step 16a, each brightness boundary in which the brightness values for all three wavelength bands in the bright side of the boundary are greater that brightness values in the dark side is identified as an illumination (shadow) boundary. In other words, such a brightness boundary is due to variation of illuminant flux rather than a change in surface reflective properties across the boundary. This criterion for identifying a brightness boundary as an illumination (shadow boundary) can also be mathematically represented as follows:

$$B_L > D_L; \text{ and } B_M > D_M; \text{ and } B_S > D_S,$$

where parameters $B_L$, $D_L$, $B_M$, $D_M$, $B_S$, and $D_S$ are defined as above.

Further, in step 16b, brightness boundaries that fail to satisfy these relations (i.e., brightness boundaries in which the brightness value in at least one wavelength band in the dark side exceeds that in the bright side) are classified as reflectance (or material) boundaries. In other words, such boundaries are due a change in surface reflectance rather than a variation of illuminant flux. Such reflectance changes can occur, for example, as a result of color changes and/or change of the type of material on the two sides of the boundary.

Figure 2:
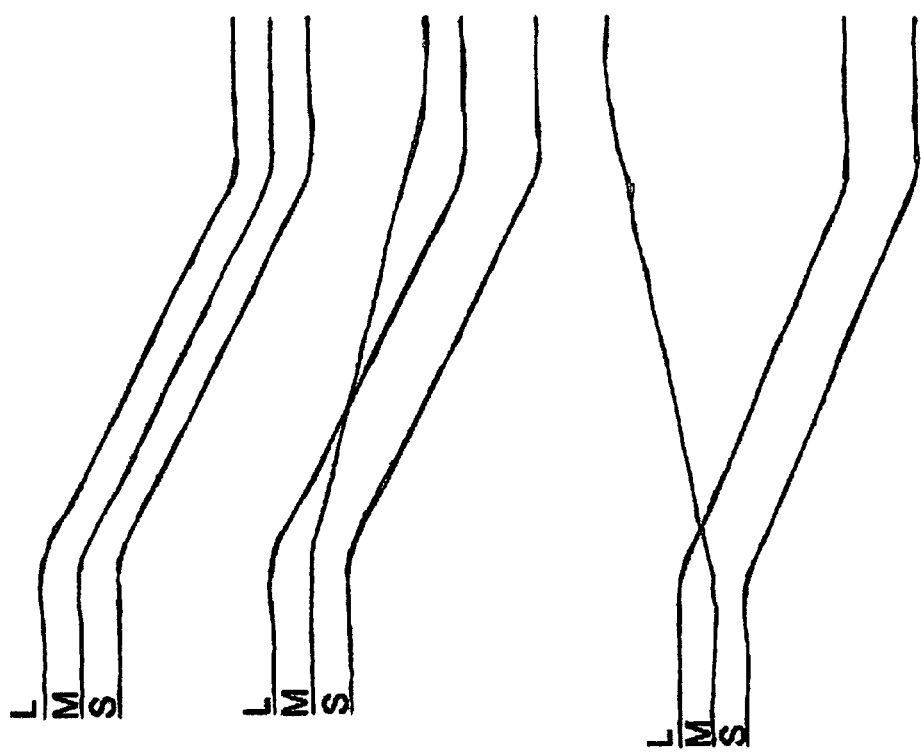
FIG. 2A is a graph schematically depicting variations of brightness in three wavelength bands across an exemplary shadow boundary generated by a single illuminant.
FIG. 2B is a graph schematically depicting variations of brightness in three wavelength bands across an exemplary "real life" shadow boundary.
FIG. 2C is a graph schematically depicting variations of brightness in three wavelength bands across an exemplary reflectance (material) boundary.

As a schematic example of variation of brightness values in three wavelength bands across illumination and reflectance boundaries, FIGS. 2A, 2B, and 2C present, respectively, a shadow boundary generated by a single illuminating source, a typical real life shadow boundary, and a reflectance boundary generated as a result of variation of surface reflectance (e.g., different materials on the two sides of the boundary), a "material boundary." In general, a brightness boundary can be sharp, or can be characterized by a region in which brightness varies gradually from the bright side to the dark side. In these illustrative figures, each brightness boundary separates a "bright side" from a "dark side," via a transition region in which the brightness values exhibit a gradual gradient.

The brightness values of the three wavelength bands (designed as L, M, S for long, medium and short wavelength bands) depicted in FIG. 2A show a common degree of decrease across the boundary. On the other hand, the brightness values of the medium wavelength band depicted in FIG. 2B shows a much less decrease between the bright and the dark side than those exhibited by the other two wavelength bands. Notwithstanding these differences, both these figures depict illumination (shadow) boundaries because, for each wavelength band, the brightness values in the "dark side" decrease relative to those in the "bright side." Conversely, FIG. 2C shows a reflectance boundary that exhibits an increase in the brightness value of the medium wavelength band from the "bright side" to the "dark side," while exhibiting a decrease in the brightness values of the other two bands from the "bright side" to the "dark side." An exemplary implementation of the methods of the invention is described below. It should, however, be understood that the methods of the invention can be implemented differently.

In some preferred embodiments for each wavelength band, differences in the brightness values between the "bright" side and the "dark" side of each brightness boundary are calculated. For a given brightness boundary, such a difference for the long wavelength band can be represented as follows:

$$B_L' = B_L - D_L,$$

wherein $B_L$ and $D_L$ denote the brightness values on the "bright" side and the "dark" side of the boundary, respectively, and $B_L'$ denotes a difference between these values.

The corresponding differences for the other wavelength bands can also be represented in a similar manner. For an illumination (shadow) boundary, the "bright" side is illuminated with both direct and ambient illuminant flux while the "dark" side is illuminated only with ambient illuminant flux. For example, for such a boundary in the long wavelength band, the brightness values on the two sides of the boundary, i.e., $B_L$ and $D_L$, can be represented as follows:

$$B_L = (I_L^a + I_L^d) R_L, \text{ and } D_L = (I_L^a) R_L,$$

wherein $I_L^a$ and $I_L^d$ denote, respectively, ambient and direct illumination flux, and $R_L$ denotes surface reflectance, which is the same on both sides of an illumination boundary.

Hence, in such a case, the difference between the brightness values across the boundary ($B_L'$) can be characterized as follows:

$$B_L' = (I_L^d) R_L.$$

This, in turn, results in the following equation for the ratio of the difference in brightness across the boundary relative to the brightness on the "dark" side of the boundary:

$$\frac{B_L'}{D_L} = \frac{I_L^d}{I_L^a}.$$

In other words, for an illumination (shadow) boundary, this ratio provides a ratio of direct illumination flux relative to ambient illumination flux irrespective of the surface reflectance values.

In many preferred embodiments, for each identified brightness boundary and for each wavelength band, a ratio of the brightness value on the "dark" side of the boundary relative to a difference in brightness values across the boundary is calculated. These ratios, for the three wavelength bands, can be represented as the following three-component vector ($\overline{V}$):

$$\overline{V} = \left( \frac{D_L}{B_L'}, \frac{D_M}{B_M'}, \frac{D_S}{B_S'} \right)$$

wherein L, M, and S denote said three wavelength bands, $D_L$, $D_M$, and $D_S$ denote brightness values in the low brightness side of the boundary for each of the three wavelength bands, respectively, and $B_L'$, $B_M'$, $B_S'$ are defined, respectively, as $$B_L' = B_L - D_L;\ B_M' = B_M - D_M;\ B_S' = B_S - D_S,$$

wherein $B_L$, $B_M$, and $B_S$ are brightness values in the high brightness side of the boundary for each of the wavelength bands, respectively. Subsequently, each vector $\overline{V}$ corresponding to one of the brightness boundaries is normalized, that is, it is divided by its length, to generate a normalized vector ($\overline{V}_N$), defined as follows:

$$\overline{V}_N = \frac{\overline{V}}{\|V\|},$$

wherein $\|V\|$ denotes the norm of $\overline{V}$.

Figure 3:
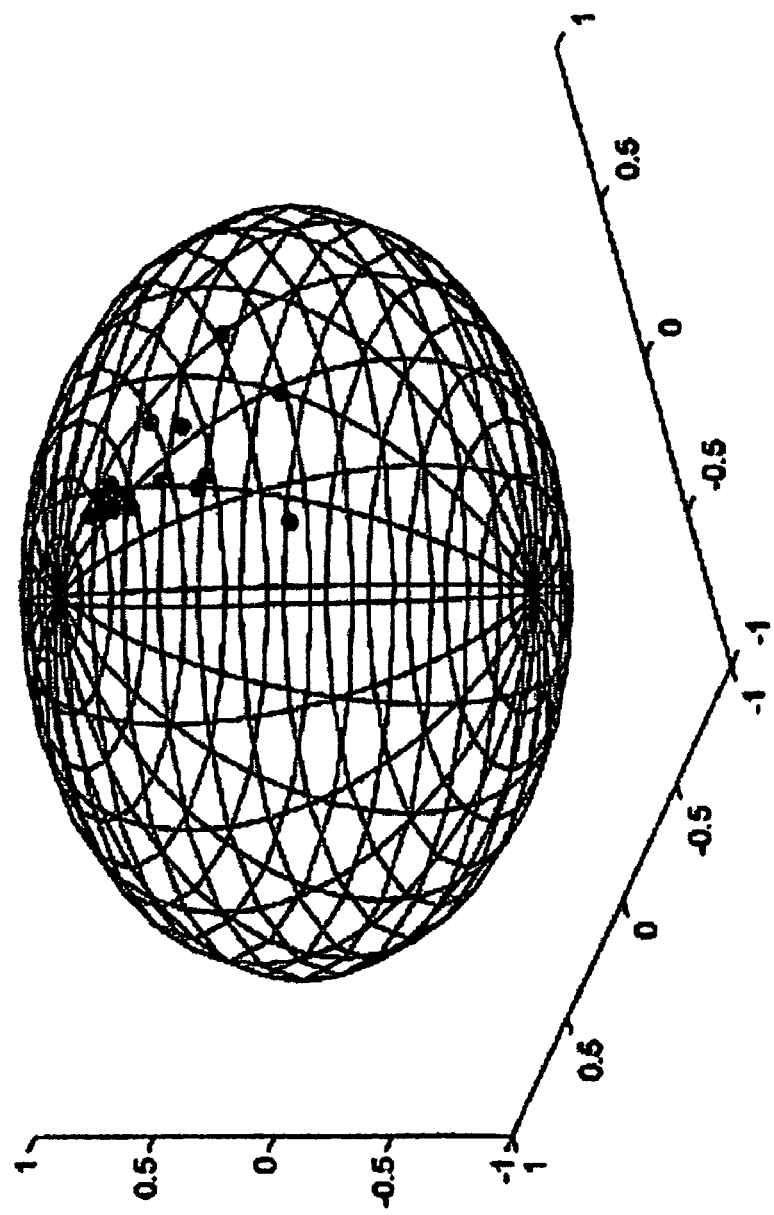
FIG. 3 schematically depicts endpoints of three-component vectors, generated in accordance with one embodiment of the methods of the invention, in a respective three-dimensional space in which vectors forming a cluster correspond to illumination boundaries.

Those of the above normalized vectors ($\overline{V}_N$) that correspond to illumination (shadow) boundaries tend to cluster around a single point in a three-dimensional coordinate space in which each coordinate corresponds to one of the vector components. In contrast, the vectors that correspond to reflectance boundaries tend to scatter in such a coordinate space. For example, FIG. 3 schematically illustrates such a three-dimensional coordinate space in which the end points of a plurality of normalized vectors (shown as red dots on the surface of the sphere), corresponding to brightness boundaries in an exemplary image, are plotted. While a set of these vectors are clustered in a region closest to the north pole of the sphere, the remainder set fails to form a cluster.

The methods of the invention utilize this clustering property of vectors corresponding to illumination boundaries to differentiate them from those that correspond to reflectance boundaries. For example, the clustered vectors can be identified as corresponding to illumination boundaries, and the scattered ones as corresponding to reflectance boundaries. In this illustrative exemplary embodiment, the vectors associated with all brightness boundaries are plotted in a three-dimensional coordinate system, and the plot is inspected to identify those vectors that form a cluster with one or more others.

To illustrate the efficacy of methods of the invention, as described above, in differentiating illumination boundaries from reflectance boundaries, Applicant performed a series of experiments under different illumination conditions (including simulating sunlight and skylight). These experiments showed that the methods of the invention can successfully distinguish material (reflectance) boundaries from illumination boundaries even in situations in which other methods, such as Land-McCann algorithm or other conventional derivative methods, would incorrectly identify all boundaries as material boundaries, and hence fail.

Figure 4:
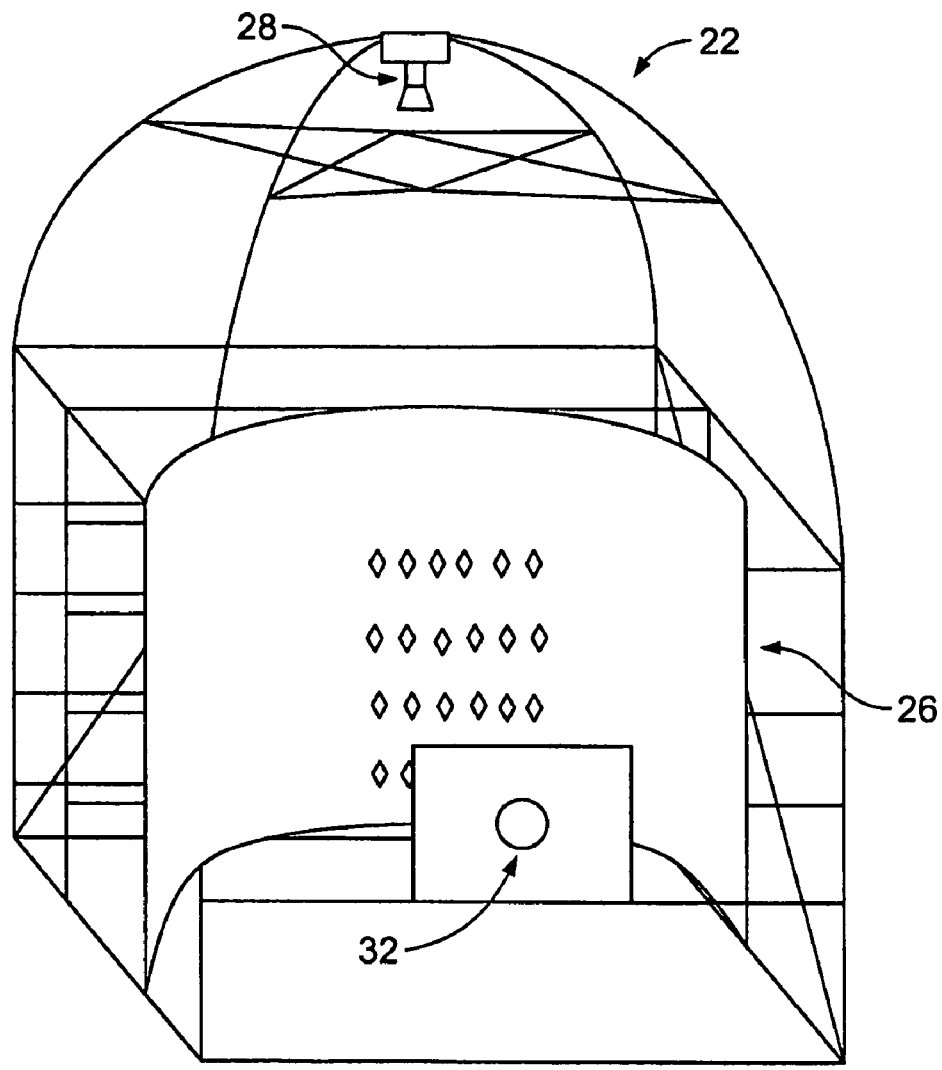
FIG. 4 schematically depicts a cubicle apparatus for testing the efficacy of the methods of the invention for differentiating illumination boundaries, particularly sharp illumination boundaries, from reflectance boundaries.

By way of example, in one such example, a cubicle apparatus 22, schematically depicted in FIG. 4, was designed and utilized to show that sharp illumination boundaries that would foil the Land-McCann algorithm, and others based on spatial thresholding, can be correctly identified by application of the methods of the invention. The cubicle 22, which is essentially a 3-dimensional Mondrian, is constructed of only material (i.e., reflectance) and step illumination boundaries, and is hence "gradient free." Twenty four elements/objects (shown as diamond-shaped elements) are suspended in front of a black velvet curtain 26, and their surfaces are pasted with colored "Munsell" paper to provide desired colors. The Mondrian 22 further includes a source of incident light 28, and a filter 30 that removes unwanted wavelength components of this light source to provide filtered light for illuminating the elements 24. A viewing port 32 allows observation of the elements, and their imaging. For example, a spectroradiometer can be pointed through this port to make measurements of the scene. There is also another light source—a ring light—surrounding the viewing port on the inside of the apparatus, which is unseen through the viewing port. The ring light source, and an accompanying filter for controlling spectral composition of the light, provide shadowless ambient illumination of the scene.

The objects 24 fall into two categories, one of which includes two types of objects. The objects in one category, as shown in FIG. 4A, and herein referred to as "diamonds," are constructed from two triangles brought together in the same plane that is tilted at 45 degrees from the vertical direction. The objects in the second category, as shown in FIG. 4B, and herein referred to as "wings" due to their shapes, include a top triangle that faces the top light 28 (i.e., tilted at 45 degrees from the vertical similar to the diamonds), and bottom triangle that is bent downward at 45 degrees from the vertical. The top triangle reflects both the incident and ambient light; the bottom triangle is in the shadow with respect to the incident (top) light while still reflecting the ambient light coming from the ring light surrounding the viewing port. The wings, therefore, contain an illumination boundary, namely, a boundary between incident+ambient light on the top triangle and the ambient light alone on the bottom triangle.

There is one type of diamond, but two types of wings. The diamonds are made of two colors, one corresponding to the bottom and the other to the top surface. On the other hand, while some of the wings have the same color on the top and the bottom surfaces, the others have different colors.

Figure 5A:
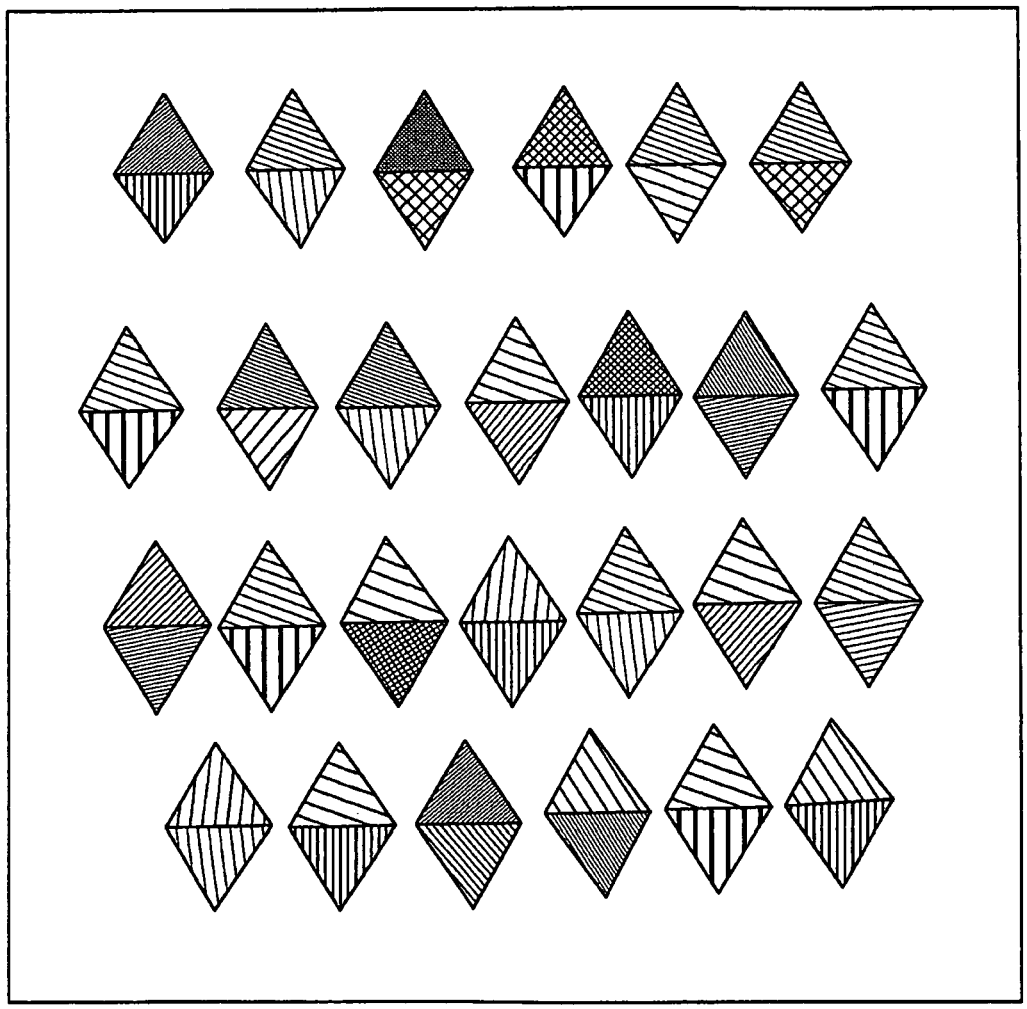
FIG. 5A is a photograph of objects suspended in the cubicle of FIG. 4 illuminated by incident light only.
Figure 5B:
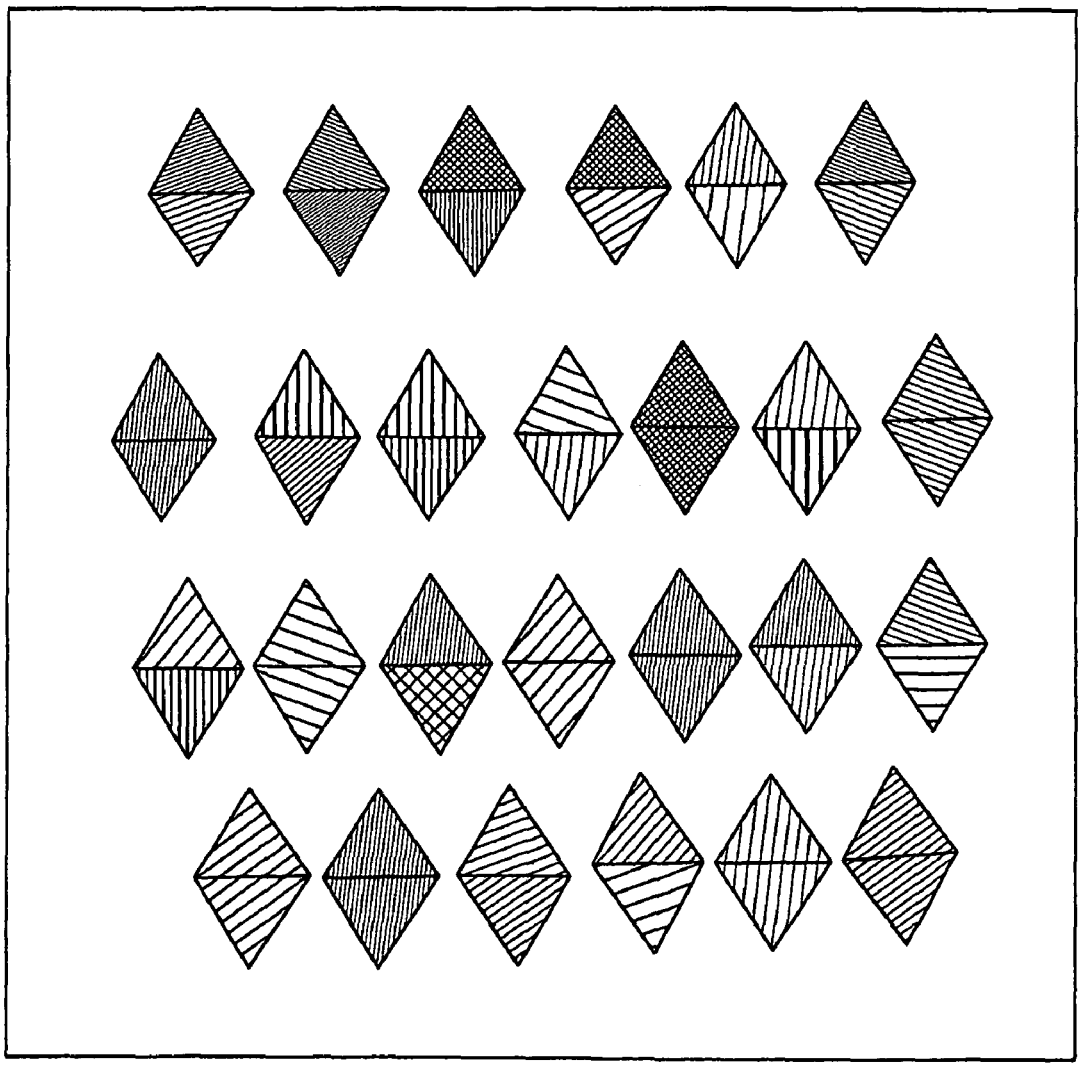
FIG. 5B is a photograph of objects suspended in the cubicle of FIG. 4 illuminated by ambient light only.
Figure 5C:
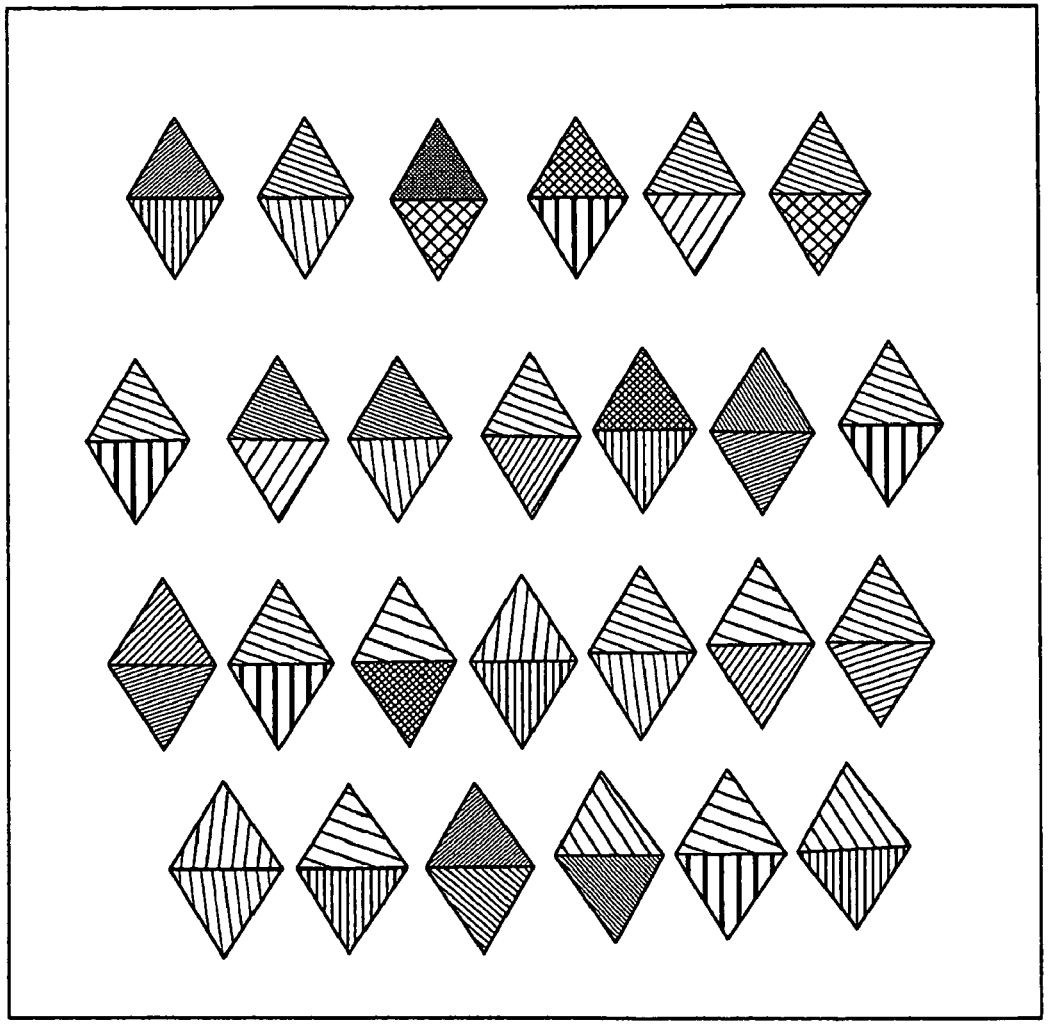
FIG. 5C is a photograph of objects suspended in the cubicle of FIG. 4 illuminated by incident and ambient lights.

FIG. 5A-5C illustrate three photographs taken through the viewing port 32 for different illuminations of the diamonds and the wings. In particular, FIG. 5A was taken when the diamonds and the two kinds of wings were illuminated by the incident light alone, and FIG. 5B was taken when these objects were illuminated by the ambient light alone. Further, FIG. 5C was taken when both the incident and the ambient lights were utilized for illumination. The incident light was filtered to resemble sunlight, and hence it has a yellowish cast; the ambient light was filtered to resemble bluish skylight.

The aforementioned three types of elements can be seen in FIGS. 5A-5C: wing "A," colored the same on top and bottom, wing "B" colored differently at top and bottom (the bottom color is chosen to look like a shadowed version of the top), and diamond "C" colored differently at top and bottom.

The top and bottom triangles of wing "A" are seen as identical in FIG. 5B as both are illuminated by ambient light. However, they are seen as different in FIG. 5A because the incident light (the only source of illumination in this case) illuminates only the top part of the wing. This difference is diminished in FIG. 5C in which illumination is provided by both the incident and ambient light. For wing "B," the boundary between the light top and the dark bottom is both a material (reflectance) as well as an illumination boundary, as evident by a comparison of FIG. 5A with FIG. 5B. On the other hand, diamond "C" represents an object having a simple material (reflectance) boundary.

Measurements were made by pointing a spectroradiometer (Pritchard 1980) through the viewing port 32 toward the top and bottom of each diamond and wing, and measuring radiance at every two nanometers of the visible spectrum (370-725 nm). A standard method of integrating radiance over the known absorption curves for long, medium, and short cones was utilized to model human cone responses. Application of the methods of the invention to these long, medium, and short measurements resulted in correct differentiation of illumination boundaries from reflectance boundaries.

However, conventional methods, especially those based on spatial gradients, fail to distinguish between single colored wings, two-colored wings, and diamonds. In other words, such methods fail to differentiate material boundaries from illumination boundaries in the above apparatus, as these boundaries do not exhibit gradients (i.e., they are sharp boundaries).

In contrast, the methods of the invention, which are generally based on the interplay of different spectra of the incident and ambient illuminants, correctly differentiate illumination boundaries from reflectance boundaries. In particular, the methods of the invention recognize illumination boundaries as having identical spectral shifts against different background colors because the same shift involving different sets of wavelengths is typically caused by the interplay between the incident and ambient illumination, and not by other factors, such as different reflectances.

Thus, the methods of the invention allow differentiating pure illumination boundaries from reflectance (material) boundaries, or from concurrent material and illumination boundaries. Such reliable differentiation of illumination boundaries from material boundaries is useful in many imaging applications, such as civil and military image analysis, computer vision, computer graphics, digital photography, and image compression.

For example, satellite images obtained at different times of a day, or during different seasons, can include changes of shadows across an imaged scene, which present a source of noise in acquired images, and render identification of actual movements of objects difficult. The methods of the invention can be applied to such images to alleviate, and preferably remove, illumination variations, and hence generate a reflectance image, which could be more readily analyzed. In particular, removing shadows reveal invariant surface reflectances. This allows identifying differences between non-contemporaneous images as representing genuine material changes on the ground. In this manner, a large volume of images can be processed to remove differences due to ever-changing illumination conditions to allow automatic screening of the images for significant material differences.

As another example, the methods of the invention can be incorporated in computer vision systems to differentiate shadows from object boundaries, thereby allowing recognition of objects irrespective of their illumination. Conventional computer vision systems operate in an inchoate brightness or radiance world that is categorically different than the stabilized reflectance-based world of human vision. Hence, conventional computer vision systems are largely confined to production-line environments and other applications in which scene illumination is constant and/or carefully controlled. In contrast, the methods of the invention can process brightness values into illumination and reflectance components, thereby enabling reliable separation of figure and ground irrespective of illuminating conditions, as well as recognition of objects based on their shapes without the confounding influence of shadows, and recognition of objects based on their color irrespective of the illumination.

Further, the methods of the invention can be employed in computer graphics applications to develop realistic models of light and surface interactions by prioritizing perceptually important scene features.

As noted above, photography is another field in which the methods of the invention can find important applications. For example, a perennial problem in photography is the difference between dynamic range of photographic print (e.g., 150:1) relative to the dynamic range associated with brightness values received from an imaged scene (e.g., 10,000:1). As a result, photographers are faced with the problem of compressing the real world dynamic range to the significantly smaller dynamic range of the photographic print, for example, by utilizing compensatory lighting. The methods of the invention can solve this problem by removing illumination variations from an image, thereby generating a reflectance image that exhibits a more manageable dynamic range. For example, the methods of the invention can be employed to factor image brightness values into separate illumination and surface reflectance components, thereby permitting discretionary re-introduction (with or without modification) of shadows to a perfectly exposed, if shadowless, reflectance image, thus diminishing the photographic "exposure" problem.

Similarly, the methods of the invention can find applications in digital videography. By way of example, the methods of the invention can be employed to provide more efficient compression of digital video. For example, the illumination variations can be compressed separately from reflectance variations.

Other applications of the methods of the invention will be apparent to those having ordinary skill in the art. In fact, the methods of the invention can be useful in any imaging device, e.g., any digital device having a lens.

Figure 6A:
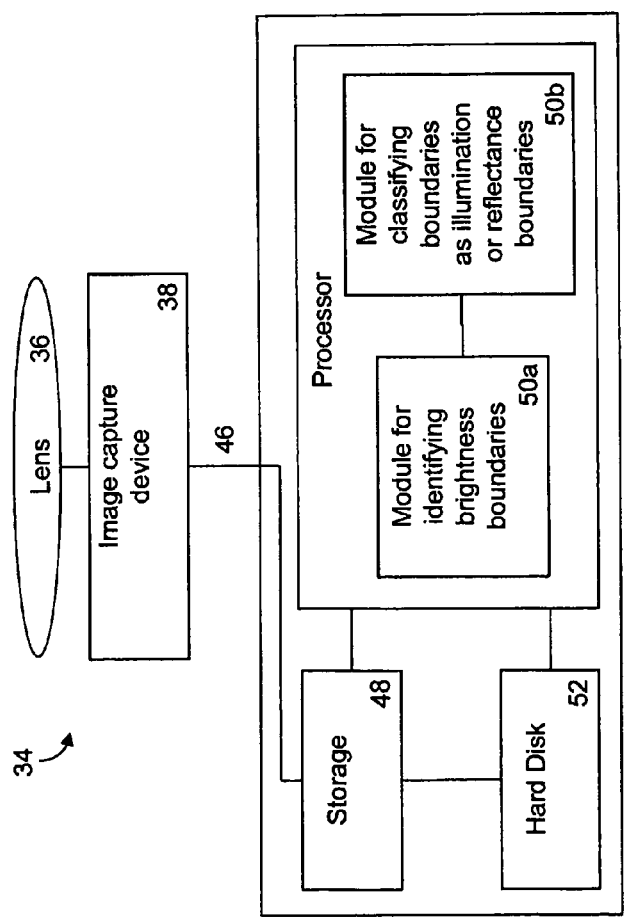
FIG. 6A schematically depicts an imaging system in accordance with one embodiment of the invention.
Figure 6B:
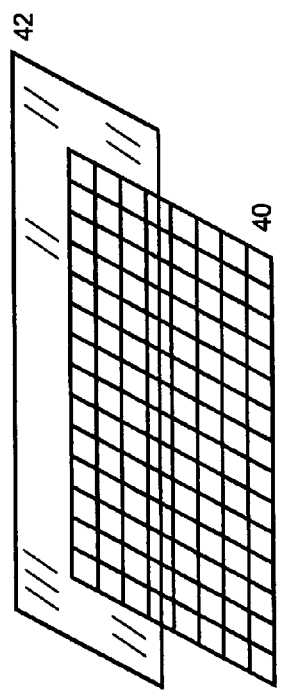
FIG. 6B schematically illustrates a CCD matrix capable of selective coupling to spectral filters, which can be utilized as an image-capture device in the imaging system of FIG. 6A.

By way of example, FIG. 6A illustrates an imaging device 34 in accordance with one embodiment of the invention having a lens 36 that projects an image of at least a portion of a scene onto an image-capturing device 38. The image capture-device 38 can be a video camera, a charge-coupled display (CCD) device, or any other device suitable for imaging a scene. For example, as shown in FIG. 6B, in some embodiments, the image-capture device includes a CCD matrix 40 that can be selectively coupled to two or more filters 42 to acquire a multi-spectral image of a scene, e.g., an image in two or more wavelength bands.

The imaging device 34 further includes an image processing module 44 that receives an image acquired by the image-capture device 38 via a communications link 46. The image can be stored in a storage 48, for example, a RAM or DRAM memory module. A processor 50 programmed to implement the methods of the invention can operate on the stored image to generate data indicative of the brightness boundaries in the image, as well as classification of their classification into illumination and reflectance boundaries. More specifically, in this exemplary embodiment, the processor 50 includes a module 50*a* that operates on the image data to identify one or more brightness boundaries, if any, of the image. Further, another module 50*b* employs the image data and the boundary information supplied by the module 50*a* to identify the brightness boundaries as illumination or reflectance boundaries by utilizing the methods of the invention. The information regarding the boundaries can be stored, if desired, in a permanent storage module 52, such as a hard disk. Although two separate processing modules are depicted here, those having ordinary skill in the art will appreciate, that the processor 50 can implement the methods of the invention by executing a single program that includes instructions for both finding brightness boundaries and classifying them as illumination and reflectance boundaries. Alternatively, a modular processing architecture, such as that shown herein, can be employed. Programs for implementing the methods of the invention can be written in any suitable programming language, such as, C, Java, or Fortran. Alternatively, the instructions for implementing the image-processing methods of the invention can be provided in hardware.

The imaging device 34 can be utilized in a variety of applications. For example, it can be incorporated in a robotic system for recognizing object boundaries without confusing the objects real outlines with their shadows. A robot having such an object-recognition capability can function not only in environments characterized by carefully-controlled uniform illumination but also in "real world" environments in which illumination can be non-uniform. For example, automated vacuum cleaning robots equipped with such an imaging system can navigate around objects without confusing their actual boundaries with their shadows. In another application, the imaging system can be utilized in a car to help a driver avoid or navigate around obstacles, or prevent collision.

Figure 7:
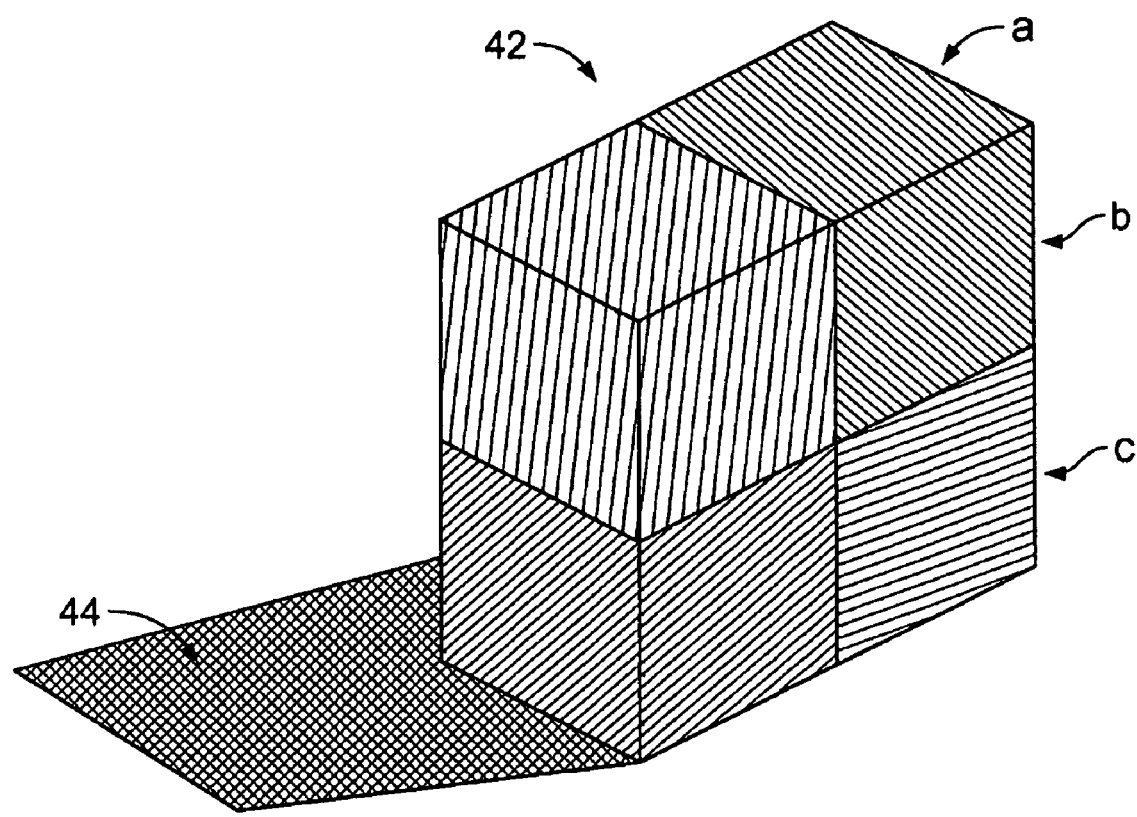
FIG. 7 depicts an image of a cube casting a shadow to which the methods of the invention can be applied to identify the shadow boundary.

This capability of the imaging device, i.e., correctly distinguishing real object boundaries from their shadows, can be better understood by reference to FIG. 7, which represents an image of a cube 42 casting a shadow. The imaging system 34 can identify the shadow boundary 44, thereby allowing a robotic system to correctly recognize the actual boundary of the cube. The legends "a," "b," and "c" on FIG. 7 may be ignored.

In another application, the imaging device 34 can be incorporated in a camera, such as a satellite imaging camera or a surveillance camera, to identify illumination and material boundaries. This information can be employed to remove the effects of shadows so as to generate a reflectance image, i.e., an image in which brightness variations are proportional to surface reflectance values. Alternatively, the effects of shadows can be re-introduced into a reflectance image to obtain the original image.

Those having ordinary skill in the art will appreciate that various modifications can be made to the above embodiments without departing from the scope of the invention.

What is claimed is:

1. A method of distinguishing illumination boundaries from reflectance boundaries in an image of a scene, comprising: a computer executing the following steps:

identifying a plurality of brightness boundaries in the image, each brightness boundary separating a high brightness side from a low brightness side, for each of three selected wavelength bands of the image and each of the brightness boundaries, determining image brightness on each side of the boundary, for each of said wavelength bands and each of the brightness boundaries, determining a brightness difference across the boundary, for each of said brightness boundaries, generating a three-component vector wherein each component is formed as a ratio of an absolute value of brightness difference across the boundary relative to brightness on the bright side of the boundary corresponding to one of the wavelength bands, normalizing said vectors, identifying a boundary as an illumination boundary if a normalized vector corresponding to said boundary forms a cluster with one or more vectors corresponding to other boundaries.

2. The method of claim 1, further characterizing each of said three-component vectors ($\overline{V}$) as follows $$\overline{V} = \left(\frac{D_L}{B'_L}, \frac{D_M}{B'_M}, \frac{D_S}{B'_S}\right)$$

wherein L, M, and S denote said three wavelength bands, $D_L$, $D_M$, and $D_S$ denote brighness values in the low brightness side of the boundary for each of the three wavelength bands, respectively, and $B'_L$, $B'_M$, $B'_S$ are defined, respectively, as $$B'_L=B_L-D_L; B'_M=B_M-D_M; B'_S=B_S-D_S,$$

wherein $B_L$, $B_M$, and $B_s$ are brightness values in the high brightness of the boundary for each of the wavelength bands, respectively.

3. The method of claim 2, further comprising normalizing said vector $\overline{V}$ to obtain a normalized vector ($\overline{V}_N$) defined as follows:

$$\overline{V}_N = \frac{\overline{V}}{\|V\|},$$

wherein $\|V\|$ denotes the norm of $\overline{V}$.

4. The method of claim 1, wherein said wavelength bands include long, medium, and short wavelength bands, respectively.

5. An imaging system, comprising an image-capture device for generating a multi-spectral image of a scene, and an image processing module operating on image to identify one or more brightness boundaries therein, and to differentiate each of said brightness boundaries into illumination and reflectance boundaries by, for each brightness boundary, separating a high brightness side from a low brightness side, for each of three selected wavelength bands of the image and each of the brightness boundaries, determining image brightness on each side of the boundary, for each of said wavelength bands and each of the brightness boundaries, determining a brightness difference across the boundary, for each of said brightness boundaries, generating a three-component vector wherein each component is formed as a ratio of an absolute value of brightness difference across the boundary relative to brightness on the bright side of the boundary corresponding to one of the wavelength bands, normalizing said vectors, identifying a boundary as an illumination boundary if a normalized vector corresponding to said boundary forms a cluster with one or more vectors corresponding to other boundaries.

6. The imaging system of claim 5, wherein said image processing module comprises a storage for storing an image data received from the image-capture device.

7. The imaging system of claim 6, wherein said image processing module comprises a processor programmed to operate on said image data to identify said brightness boundaries and to classify them into illumination and reflectance boundaries.

8. The imaging system of claim 7, wherein said processor comprises a module for operating on said image to determine brightness boundaries therein.

9. The imaging system of claim 8, wherein said processor further comprises another module for utilizing information regarding said brightness boundaries and said image data to classify said boundaries into illumination and reflectance boundaries.

* * * * *